US012573293B2

(12) United States Patent
Skwarcan

(10) Patent No.: US 12,573,293 B2
(45) Date of Patent: ***Mar. 10, 2026

(54) METHODS AND SYSTEMS FOR ADVANCED TRAFFIC ANALYSIS

(71) Applicant: Chester Michael Skwarcan, Danville, IN (US)

(72) Inventor: Chester Michael Skwarcan, Danville, IN (US)

(73) Assignee: Chester Michael Skwarcan, Danville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,481

(22) Filed: Jan. 29, 2024

(65) Prior Publication Data

US 2025/0061804 A1 Feb. 20, 2025

Related U.S. Application Data

(60) Provisional application No. 63/519,993, filed on Aug. 16, 2023.

(51) Int. Cl.
| | |
|---|---|
| *G08G 1/07* | (2006.01) |
| *G06V 20/52* | (2022.01) |
| *G06V 20/62* | (2022.01) |
| *G08G 1/01* | (2006.01) |
| *G08G 1/017* | (2006.01) |
| *G08G 1/08* | (2006.01) |

(52) U.S. Cl.
CPC .............. *G08G 1/08* (2013.01); *G06V 20/52* (2022.01); *G06V 20/625* (2022.01); *G08G 1/0133* (2013.01); *G08G 1/017* (2013.01)

(58) Field of Classification Search
CPC ........ G08G 1/08; G08G 1/0133; G08G 1/017; G08G 1/0112; G08G 1/0116; G08G 1/0129; G08G 1/0175; G08G 1/04; G06V 20/52; G06V 20/625; G06V 20/54
USPC ......................... 340/917, 905, 907, 909, 916
See application file for complete search history.

(56) References Cited

U.S. PATENT DOCUMENTS

| | | | | |
|---|---|---|---|---|
| 11,301,693 B2* | 4/2022 | Hannah | ................ | G08G 1/0133 |
| 2011/0309950 A1* | 12/2011 | Rothschild | ............... | G08G 1/04 |
| | | | | 340/936 |
| 2017/0263122 A1* | 9/2017 | Kamajaya | ............... | H04W 4/44 |

(Continued)

*Primary Examiner* — Anh V La

(74) *Attorney, Agent, or Firm* — Woodard, Emhardt, Henry, Reeves & Wagner, LLP

(57) ABSTRACT

A method is provided for controlling traffic management infrastructure, comprising: capturing images of vehicle license plates converting the images into license plate data including license plate characters; transmitting the license plate data to a central server having a data collection module, a data anonymization module, a data storage module and a data analysis module; extracting the license plate characters from the license plate data; packaging the license plate characters in license plate files; anonymizing the license plate files; storing, by the data storage module, the anonymized license plate files; analyzing the anonymized license plate file to identify a traffic condition; and outputting at least one command to at least one component of traffic management infrastructure, thereby causing the component to adjust an aspect of traffic management based upon the identified traffic condition.

20 Claims, 4 Drawing Sheets

(56)     References Cited

U.S. PATENT DOCUMENTS

| | | | | |
|---|---|---|---|---|
| 2018/0190111 A1* | 7/2018 | Green | .................... | G08G 1/052 |
| 2021/0097306 A1* | 4/2021 | Crary | .................... | G06V 20/54 |
| 2022/0335820 A1* | 10/2022 | Wang | ................... | G08G 1/0141 |
| 2023/0136925 A1* | 5/2023 | Pu | ........................ | G08G 1/0133 |
| | | | | 701/117 |

* cited by examiner

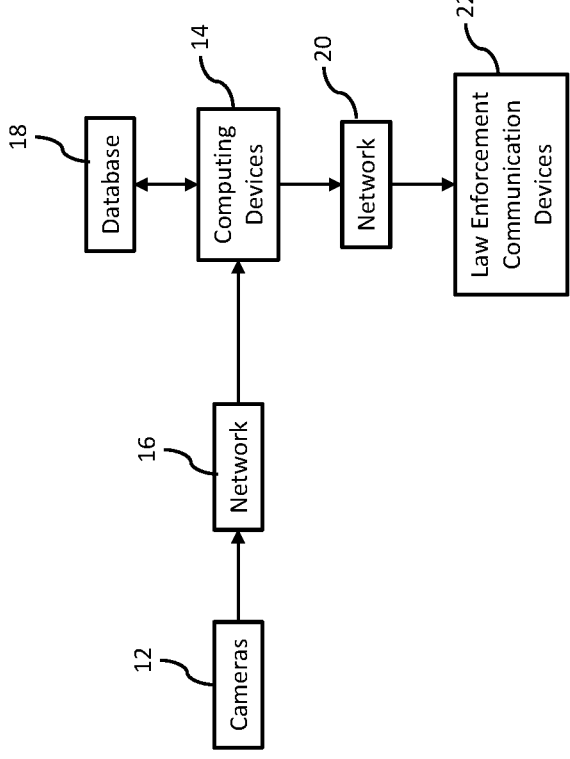
FIG. 1 – PRIOR ART

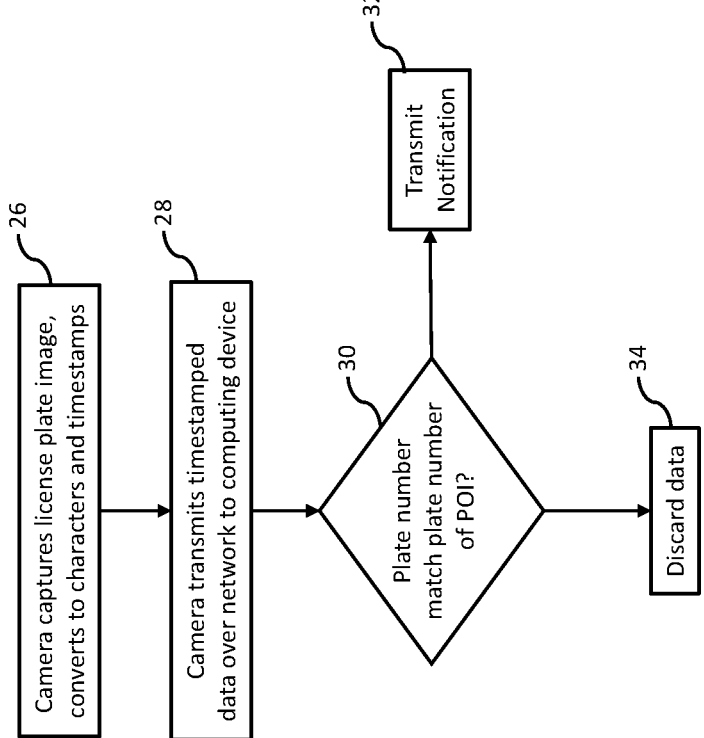
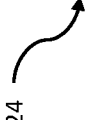
FIG. 2 – PRIOR ART

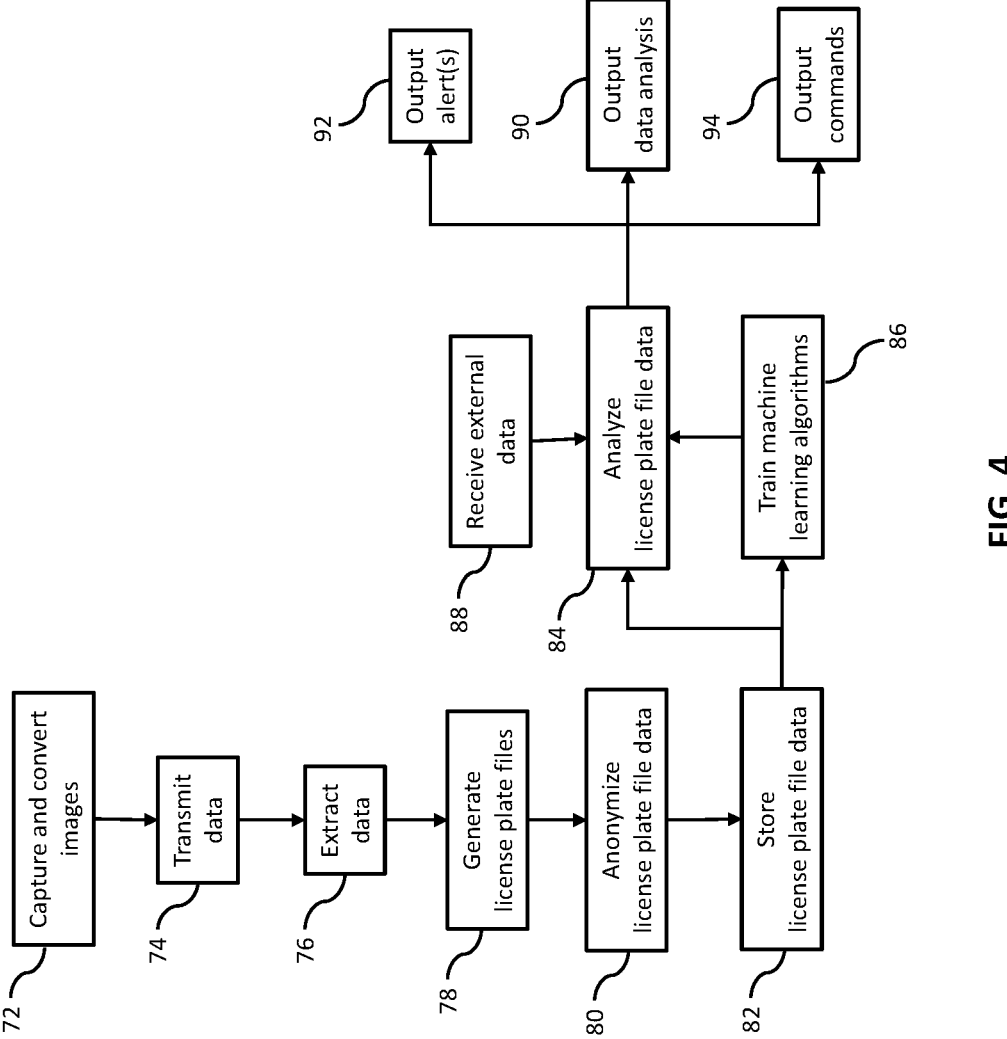
FIG. 4

METHODS AND SYSTEMS FOR ADVANCED TRAFFIC ANALYSIS

CROSS-REFERENCE TO RELATED APPLICATIONS

The present disclosure claims the benefit of U.S. Provisional Application Ser. No. 63/519,993, filed on Aug. 16, 2023, the entire disclosure of which being expressly incorporated herein by reference.

FIELD OF THE DISCLOSURE

The present disclosure relates to devices, systems, and methods for analyzing traffic information and providing actionable intelligence based upon the analyses.

BACKGROUND

Current traffic data collection methods, while functional, present several key limitations. For example, traditional methods often rely on sporadic, manual data collection that provides only snapshots of traffic flow at specific times. This results in an inability to monitor traffic patterns in real-time or respond quickly to sudden changes or anomalies. Additionally, manual traffic surveys require substantial human resources and can be time-consuming and expensive to conduct. These costs increase significantly when long-term, continuous data is required. Moreover, conventional methods often simply count vehicles and do not consider vehicle-specific information. As a result, they provide an imprecise picture of actual traffic patterns on a vehicle-by-vehicle basis and may miss important trends or changes. Such systems also typically operate independently of traffic management systems (e.g., traffic signal timing controls), resulting in a disconnect between data collection and analysis, and actual traffic control measures. In addition to real-time limitations, existing solutions often lack the ability to forecast future traffic patterns based on historical data, which could help in strategic traffic planning and management. Also, the data collected by conventional systems is often not easily accessible or usable by third-party developers, limiting the potential for innovative applications that could enhance traffic management and planning. As such, there exists a need to provide an improved traffic analysis system that enables more efficient, precise, and integrated traffic data collection and analysis.

SUMMARY

In one embodiment, the present disclosure provides a method of controlling traffic management infrastructure, comprising: capturing images of vehicle license plates using a plurality of cameras; converting the images to license plate data including license plate characters; transmitting the license plate data via a first network to a central server having a data collection module, a data anonymization module, a data storage module and a data analysis module; extracting, by the data collection module, the license plate characters from the license plate data; packaging, by the data collection module, the license plate characters in license plate files; anonymizing, by the anonymization module, the license plate files; storing, by the data storage module, the anonymized license plate files; analyzing, by the data analysis module, the anonymized license plate file to identify a traffic condition; and outputting, by the data analysis module, at least one command to at least one component of traffic management infrastructure, thereby causing the component to adjust an aspect of traffic management based upon the identified traffic condition. In one aspect of this embodiment, the plurality of cameras are motion-sensitive, high-speed traffic cameras. In another aspect, transmitting the images via the network to the central server occurs in near real-time with the capturing step. In yet another aspect, extracting includes extracting, by the data collection module, timestamp data, vehicle type and camera ID data from the license plate data. In a variant of this aspect, packaging includes packaging, by the data collection module, the timestamp data, the vehicle type and the camera ID data into the license plate files. In another aspect, anonymizing includes transforming, by the anonymization module, characters in the extracted license plate characters into a format which prevents recreation of the extracted license plate characters. In another aspect, storing includes indexing, by the data storage module, data in the anonymized license plate files based upon parameters including time, location or camera ID. In another aspect, analyzing the anonymized license plate file includes providing the anonymized license plate file to at least one machine learning model and identifying, based upon an output of the at least one machine learning model, the traffic condition. In still another aspect, analyzing the anonymized license plate file includes receiving, from at least one external data source, external data representing at least one of a current weather condition, a public transportation schedule or special even information. Another aspect of this embodiment further comprises outputting by the data analysis module, a notification regarding the traffic condition to a user interface via a second network. In another aspect, the traffic condition includes a traffic volume, a traffic pattern, or a traffic anomaly. In still another aspect, the component of the traffic management infrastructure is a traffic signal and the aspect adjusted is a timing of operation of the traffic signal.

In another embodiment of the present disclosure, a traffic analysis system is provided, comprising: a plurality of cameras, each camera of the plurality of cameras being configured to capture images of license plates on vehicles passing the camera and convert the images into license plate data including license plate characters; a central server coupled to the plurality of cameras via a first network, the central server including a data collection module, a data anonymization module, a data storage module and a data analysis module; and a traffic management component coupled to the central server via a second network; wherein the data collection module is configured to receive the license plate data from the plurality of cameras and package the license plate characters in license plate files; wherein the anonymization module is configured to anonymize the license plate files; and wherein the data analysis module is configured to analyze the anonymized license plate file to identify a traffic condition and output at least one command to the traffic management component, thereby causing the component to adjust an aspect of traffic management based upon the identified traffic condition. In one aspect of this embodiment, the data collection module is coupled to the plurality of cameras via the first network to receive the images in near real-time. In another aspect, the data collection module is further configured to extract timestamp data, vehicle type data and camera ID data from the images. In still another aspect, the anonymization module is configured to transform characters in the extracted license plate characters into a format which prevents recreation of the extracted license plate characters. In another aspect, the central server further includes at least one machine learning model configured to receive the anonymized license plate files and provide an output the data analysis module uses to identify the traffic condition. In yet another aspect, the data analysis module is further configured to receive, from at least one external data source, external data representing at least one of a current weather condition, a public transportation schedule or special even information. In another aspect of this embodiment, the traffic management component is a traffic signal and the aspect adjusted is a timing of operation of the traffic signal.

In another embodiment, the present disclosure provides a method for analyzing traffic, comprising: capturing images of vehicle license plates using a plurality of cameras and converting the images into license plate data including license plate characters; transmitting the license plate data via a first network to a central server having a data collection module, a data anonymization module, a data storage module and a data analysis module; extracting, by the data collection module, the license plate characters from the license plate data; packaging, by the data collection module, the license plate characters in license plate files; anonymizing, by the anonymization module, the license plate files; storing, by the data storage module, the anonymized license plate files; analyzing, by the data analysis module, the anonymized license plate file to identify a traffic condition; and outputting, by the data analysis module, a notification regarding the traffic condition to at least one user interface.

While multiple embodiments are disclosed, still other embodiments of the disclosure invention will become apparent to those skilled in the art from the following detailed description. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIG. 1 is a conceptual diagram depicting aspects of a prior art system for monitoring traffic;

FIG. 2 is a flow chart depicting a method corresponding to the system depicted in FIG. 1;

FIG. 4 is a flow chart depicting a method corresponding to the system depicted in FIG. 3.

Figure 3:
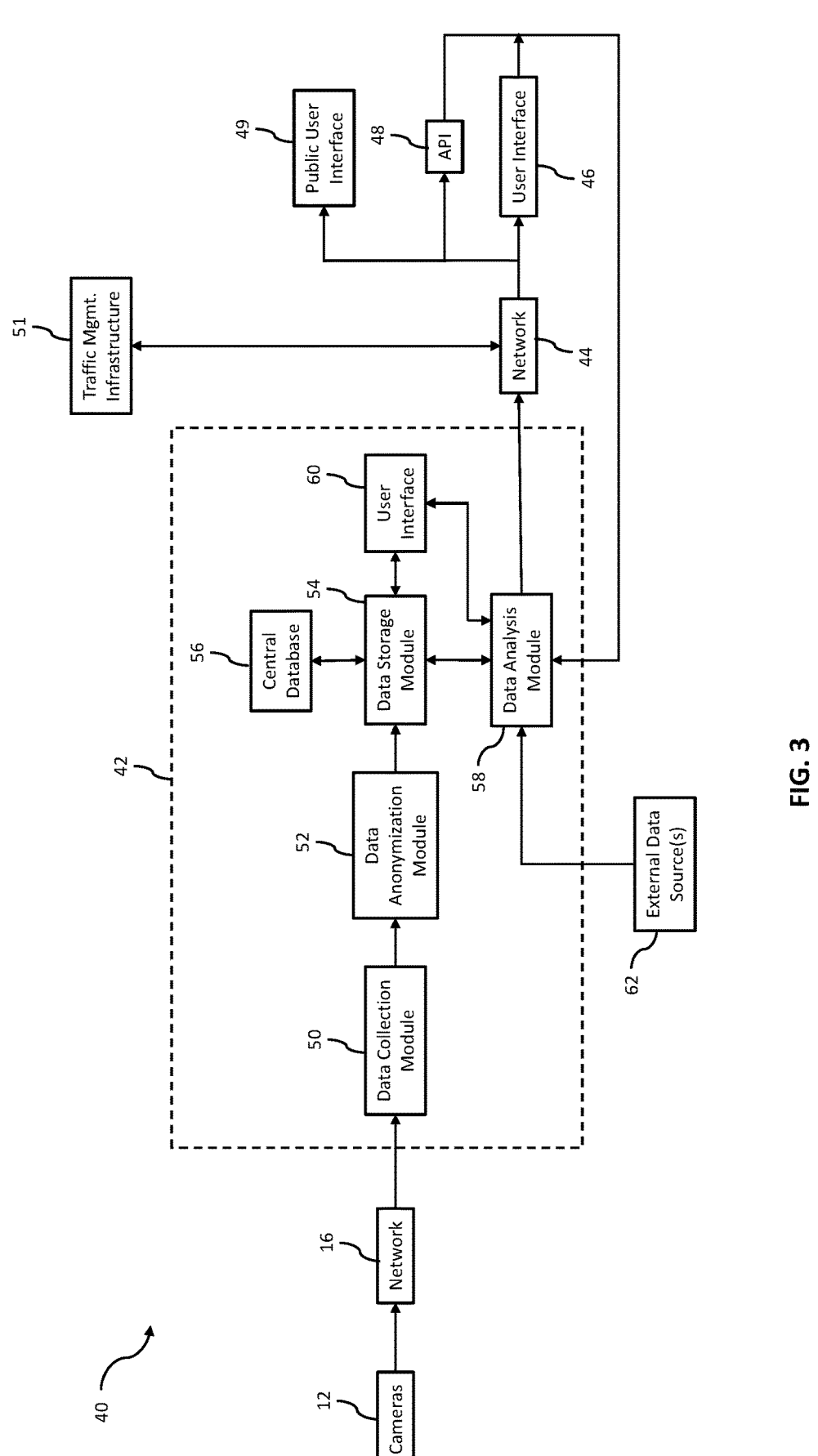
FIG. 3 is a conceptual diagram depicting aspects of a system for analyzing traffic information according to the present disclosure.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION OF EMBODIMENTS OF THE DISCLOSURE

To provide an overview, the systems and methods of the present disclosure fill the critical need for more robust, efficient, and cost-effective traffic data collection and analysis. Despite the ubiquity of law enforcement license plate cameras, their potential for comprehensive traffic analysis remains untapped. The teachings of the present disclosure repurpose these cameras to collect and provide analyzed granular, per-vehicle traffic data in real-time and retrospectively.

In certain embodiments, the present disclosure addresses the difficulty in accessing real-time traffic data and long-term traffic trends to enable immediate responses to traffic anomalies and facilitate more accurate planning and forecasting by traffic engineers and planners. In other embodiments, the present disclosure offers a solution to the high costs and time associated with traditional traffic data collection by reducing the amount of additional data required.

In a basic embodiment, the present disclosure provides a data collection and analysis system that utilizes existing license plate cameras deployed by law enforcement. As is further described below, the basic embodiment includes a data collection module that interfaces with the license plate cameras to collect per-vehicle data, including timestamped license plate numbers converted by the license plate cameras from images of the license plates. This embodiment further includes a database storage module and central database configured to store the collected data in a structured and retrievable format. Finally, the basic embodiment includes a data analysis module including algorithms for determining traffic volumes, identifying patterns and calculating travel times between two points using the collected timestamps. These core functional components continuously collect and store data from each license plate camera, and then analyze the data to yield actionable traffic insights as is further described below. While the basic embodiment does not include real-time alerts or advanced analytics, it nonetheless provides the foundation for performing traffic analysis and planning tasks.

In other, more comprehensive embodiments, the present disclosure provides real-time traffic anomaly alerts using predictive algorithms to identify traffic pattern anomalies, such as sudden traffic congestion, and communications infrastructure to alert transportation engineers and planners and law enforcement, enabling them take immediate corrective actions. Moreover, in such comprehensive embodiments the present disclosure may be integrated with existing traffic management systems to automatically adjust the timing characteristics of traffic signals, for example, based on the analyzed data, thereby improving traffic flow efficiency. In certain embodiments, the data is analyzed using machine learning algorithms which identify and predict traffic trends to permit more accurate traffic forecasting and proactive traffic management. In any of these various embodiments, the system of the present disclosure may provide enhanced privacy by incorporating advanced encryption or anonymization techniques to prevent access to a vehicle owner's license plate information while still permitting the traffic analysis described herein.

Other aspects of embodiments of the present disclosure relate to access to the analyzed data. For example, data visualization tools may be included to graphically represent traffic patterns or provide interactive charts and/or graphs, making the data more accessible and understandable for transportation engineers and others. In another example, the data could be made available to third-party developers through an Application Programming Interface ("API") for use in creating related applications of services. Finally, a public user interface may be included to provide real-time traffic updates to the general public, helping individuals plan their commutes or other travel more effectively.

The most complete embodiment of this disclosure is a comprehensive, intelligent traffic data collection and analysis system. This system capitalizes on the existing network of law enforcement license plate cameras to gather, store, and evaluate real-time and historical per-vehicle traffic data as is further described below.

Referring now to FIG. 1, a prior art system for collecting and analyzing vehicle information is shown. System 10 includes a plurality of motion-sensitive, high-speed traffic cameras 12 which are located at various places, sometime temporarily, along certain streets, roads, highways, etc. Such cameras 12 are provided by various law enforcement agencies to capture timestamped images of license plates of vehicles to identify one or more vehicles associated with a person of interest ("POI") and/or one or more stolen vehicles or a vehicle of interest ("VOI"). At present, it is estimated that over 52,000 cameras 12 are deployed across the United States. The cameras 12 are connected to a plurality of law enforcement computing devices 14 (only one shown) via one or more networks 16 (only one shown). In this manner, each time a camera 12 captures an image of a license plate, the camera 12 timestamps the image, converts the image of the license plate to characters using, for example, optical character recognition software, and transmits the time-stamped license plate characters, along with the vehicle type and camera location over the network 16 to the computing devices 14.

Conventionally, the computing devices 14 compare the license plate characters to license plate characters stored in one or more databases 18 in communication with the computing devices 14. The license plate characters stored in the database 18 may include license plate characters associated with POIs in one or more criminal investigations or license plate characters associated VOIs, etc. (collectively referred to herein as "license plate characters of interest or 'LPCOIs'"). If the computing devices 14 identify a match between a license plate character from an image taken by a particular camera 12 and an LPCOI in the database 18, then the computing device 14 may conclude that it is likely that a POI is in a vehicle from which the license plate image was obtained or a VOI has been identified at a particular location (i.e., the location corresponding to the camera 12 from which the license plate image was sent) at a particular time (i.e., the time corresponding to the timestamp associated with the license plate image), and traveling in a particular direction (i.e., a direction discerned from the known orientation of the camera 12). The system 10 further includes a second network 20 in communication with the computing devices 14 and a plurality of law enforcement communication devices 22. If the computing devices 14 identify a match as described above, then the computing devices 14 may transmit a notification over the network 20 to the law enforcement communication devices 22 to inform the law enforcement personnel associated with the law enforcement communication devices 22 that a POI and/or a VOI was likely traveling in a particular direction on a particular street at a particular time. The law enforcement personnel may use this information to track down the POI and/or the VOI.

Referring now to FIG. 2, a prior art method 24 carried out by the system 10 of FIG. 1 is shown. At step 26, the plurality of cameras 12 capture images of license plates on vehicles traveling past the cameras 12, converts the license plate images to license plate numbers, and timestamps the images. At step 28, the cameras 12 transmit the timestamped license plate characters along with the vehicle type and camera location over the network 16 to the computing devices 14. At step 30, the computing devices 14 compare the license plate characters to LPCOIs stored in the one or more databases 18 to determine whether a captured license plate character matches an LPCOI stored in the database 18. If a captured plate character matches an LPCOI, then at step 32 the computing devices 14 transmit a notification over the network 20 to the law enforcement communication devices 22 as described above. Otherwise, the data associated with the non-matching license plate number is discarded at step 34.

Referring now to FIG. 3, one embodiment of an advanced traffic data analysis system is depicted. System 40 generally includes a plurality of motion-sensitive, high-speed cameras 12 as described above with reference to FIG. 1, a first network 16 connected to the cameras 12, a central server 42, a second network 44, a user interface 46, an API 48, a public user interface 49 and one or more external data sources 62. The central server 42 generally includes a data collection module 50, a data anonymization module 52, a data storage module 54, a central database 56, a data analysis module 58 and a user interface 60.

As indicated above, the cameras 12 capture images of vehicle license plates in real-time as vehicles pass the cameras 12. As the license plate images are captured, they are converted to license plate characters, timestamped and transmitted to the central server 42 over the network 16 in near real-time. The vehicle type (e.g., motorcycle, car, truck, bus, etc.) and the camera location is also transmitted. The first network 16 may include one or more networks that facilitate communications between the cameras 12 and the central server 42. The first network 16 may be a wireless network, a wired network, or a combination of both.

The data collection module 50 includes hardware and software configured to receive the incoming license plate characters from the network 16. The data collection module 50 packages the identified characters in a license plate file corresponding to the license plate image. The data collection module 50 also identifies the particular camera 12 associated with an incoming license plate image from a camera ID provided with the image, and includes the camera ID in the license plate file. Thus, the central server 42 may determine the location and direction of travel of a vehicle corresponding to the captured license plate as is further described below. Finally, the data collection module 50 is configured to extract the timestamp from each incoming license plate image from metadata associated with the image at the time of its creation by the corresponding camera 12. The timestamp is also included in the license plate file.

The data collection module 50 is configured to be compatible with any of the plurality of cameras 12 and data formats used by the cameras 12. The data collection module 50 includes software that connects, via the network 16, to the APIs and data output streams of the cameras 12, accommodating the various data protocols and formats. The data collection module 50 may be configured to access the license plate image data from the cameras 12 in near real-time, on a fixed access schedule or, alternatively, on demand depending upon the application. In certain applications, substantially constant access to the incoming license plate data streams may be desirable, whereas in other applications periodic access (e.g., every minute, every hour, every day, etc.) may be sufficient. In certain embodiments, the data collection module 50 is configured to be modified as necessary to maintain compatibility with new models of cameras 12 or upgrades to existing camera systems.

The data anonymization module 52 is configured to encrypt and/or anonymize the information included in the license plate files generated by the data collection module 50. As should be apparent to those skilled in the art, a variety of potential privacy issues may be implicated by the collection and transmission of license plate information that includes the timestamped location and direction of travel of the vehicle having the captured license plate. As such, the system 40 of the present disclosure via the data anonymization module 52 incorporates encryption and anonymization techniques that protect the privacy of individual drivers while still permitting analysis and use of the underlying traffic data. In certain embodiments, all license plate data received by the data anonymization module 52 (i.e., all license plate files) is encrypted before transmission over the network 16 to ensure that it remains secure during processing by the central server 42. In certain embodiments, the encrypted license plate data is transmitted over secure, encrypted communication channels represented by the network 16. In any of such embodiments, the encryption keys may be tightly controlled and accessible only to authorized personnel.

The anonymization module 52 is configured to transform the characters in the license plate files received from the data collection module 50 into an unidentifiable format that prevents recreation of the actual sequence of characters corresponding to the license plate originally captured by a camera 12. As such, the system 40 is compliant with the relevant privacy laws and regulations, including GDPR, CCPA and other regional and national data protection standards. In addition to anonymizing the license plate data, the anonymization module 52 is configured to mask or remove other potentially identifying information from the license plate files before storage or analysis by the central server 42. It should be understood, however, that in situations where law enforcement requires access to the original license plate data for legal purposes, the system 40 may incorporate methods to reverse the anonymization.

The data storage module 54 receives the anonymized license plate files from the anonymization module 52. The data storage module 54, along with the central database 56, provides a database system designed to store the collected data in a structured and retrievable format. The data storage module 54 is configured to store the data included in the license plate files in a structure based on a relational database model, where the data is stored in tables with defined relationships in the central database 56. Each entry in the central database 56 includes data points such as license plate numbers (as anonymized by the anonymization module 52), timestamps, camera IDs and geographical coordinates of the camera 12, all organized in a manner to facilitate correlation and analysis. To enhance retrievability of the data by the data analysis module 58, the data is indexed based on parameters such as time, location and unique identifiers. This indexing allows for quick and efficient querying of the database 56, enabling users to retrieve specific data subsets based on their analytical needs. Moreover, the central database 56 is designed to be scalable, and is capable of accommodating large quantities of data that accumulate over time from the plurality of cameras 12. In some embodiments, the data storage module 54 may be in communication with the user interface 60 of the central server 42 which may be used to perform complex queries and data retrieval operations that support various analytical tasks and reports generated by end users. Finally, it should be understood that the central database 56 is configured to adhere to strict data security protocols and to comply with relevant privacy regulations. As such, access control, encryption and regular security audits may be used to safeguard the data stored in central database 56.

The data analysis module 58 performs a variety of functions by accessing the anonymized data in the central database 56. At a high level, the data analysis module 58 identifies traffic trends, calculates travel times of individual vehicles, predicts traffic flows and volumes, provides real-time traffic information and generates alerts or notifications of traffic anomalies. The data analysis module 58 is configured to provide the output of these analyses (i.e., real-time information, forecasts, reports, etc.) to the user interface 60 and/or the user interface 46, the API 48 and/or the public user interface 49 via the network 44. In this manner, the data analysis module 58 may, among other things, permit traffic managers to swiftly respond to anomalies in traffic volume or patterns. In addition or alternatively, the output of the analyses of the data analysis module 58 may be routed to a user interface 46 that is in communication with or operated by emergency response personnel to provide information about potential accidents and/or to recommended routes for emergency responses based on traffic conditions and historical data. Moreover, the outputs of the data analysis module 58 may be directly integrated with various traffic management systems to permit real-time adjustments to traffic signals as is further described below.

The basic functions performed by the data analysis module 58 may be summarized as determining traffic volumes and identifying traffic patterns. To determine traffic volumes, the data analysis module 58 accesses the data in the central database 56 to count the number of vehicles (using the anonymized license plate data) that pass through a specific point or area (covered by one or more cameras 12) within a given timeframe (using the associated timestamps). The data analysis module 58 may use the resulting traffic volume determinations to compute traffic volume variations over different times of day, different days of the week, different times of the year, or other relevant time periods. In this manner, the data analysis module 58 may identify peak traffic hours and other periods of relatively low traffic activity. In other embodiments, the data analysis module 58 combines the traffic volume data with geospatial information from the cameras 12 to provide a spatial understanding of traffic volume across different parts of a city or region. This analysis may be useful to public agencies responsible for urban planning, infrastructure development and/or public transportation. For example, such agencies may make decisions about future projects with insights provided by the system 40 regarding the environmental impact of traffic, such as pollution levels and noise.

To identify traffic patterns, trends and anomalies, the data analysis module 58 employs machine learning techniques. The patterns may be related to vehicle flow, congestion points and typical traffic behaviors. The data analysis module 58 may also use historical data in the central database 56 to predict future traffic trends, thereby aiding in proactive traffic management and planning. For example, if a congestion or bottleneck is predicted for a future time at a particular location, then traffic engineers may take preemptive measures to mitigate the severity of such a traffic jam. The machine learning models of the data analysis module 58 are trained on historical traffic data collected by the system 40. After sufficient training, the models learn typical traffic patterns including peak hours, normal flow variations and regular congestion points. The models are designed to continuously learn and improve over time as new traffic information is collected from license plate data as is further described herein. In this manner, the system 40 can forecast traffic conditions for a particular time or traffic situation.

The historical data may also be used to identify traffic anomalies in real-time. For example, the data analysis module 58 may compare current traffic conditions (e.g., current traffic flow) at a particular location to historical traffic conditions at that location to identify unusual or anomalous traffic flow (e.g., sudden increases or decreases) in real-time. The data analysis module 58 may then generate an alert or notification for transmission via the network 44 to the user interface 46, thereby alerting transportation engineers, for example, of a current traffic anomaly. In some circumstances, the transportation engineers may adjust traffic light timing, issue travel advisories, or deploy resources such as traffic control personnel, for example, to address the traffic anomaly. This information is provided as feedback to the data analysis module 58 for further training of the machine learning models to improve the accuracy of the predictions generated by the models.

In certain embodiments, supervised machine learning models are used by the data analysis module 58. These models use labeled traffic data to learn the relationship between input variables (e.g., time of day, time of year, location, weather conditions, etc. as is described herein) and the outcome (such as traffic volume or congestion levels). In other embodiments, the data analysis module 58 uses unsupervised machine learning models which analyze unlabeled data to find hidden structures or patterns in traffic data without pre-assigned categories or labels. In still other embodiments, the data analysis module 58 employs reinforcement machine learning models which use a trial-and-error approach to find optimal strategies for traffic management, learning from the outcomes of previous actions. In other embodiments, a mixture of some or all of the previously mentioned machine learning models is used.

In alternative embodiments, the data analysis module 58 may use the machine learning models to provide predictions of the impact of changing road conditions such as road closures, new infrastructure, and/or changes in traffic signal timing before such changes are implemented. The data analysis module 58 may provide input data to the machine learning modules that simulates such changes in infrastructure and the models will provide predictions on the impact of the changes. In this manner, the system 40 may be used to test various possible alterations to the traffic network to determine a preferred alteration without implementing any infrastructure change.

In other embodiments, the data analysis module 58 receives external data such as current weather conditions, public transportation schedules and information about special events (e.g., concerts, marathons, etc.) from the one or more external data sources 62 and uses that information along with the traffic information to understand and predict the impact of such conditions and events on traffic flow and patterns. Again, the data analysis module 58 may provide notifications via the network 44 to the user interface 46 to permit traffic engineers and/or law enforcement to anticipate upcoming traffic conditions and take steps to mitigate them. In addition, or alternatively, the data analysis module 58 may provide alerts to the public user interface 49 to notify the general public of predicted traffic conditions so drivers can plan accordingly.

Unlike conventional systems such as that depicted in FIG. 1, the system 40 according to embodiments of the present disclosure operates with per-vehicle data, which provides an unprecedented granularity that enhances the precision and depth of the traffic analysis. This per-vehicle data includes individual vehicle movements with timestamps and location information. As a result, the system 40 can analyze each vehicle's behavior and path through the network of roads and streets monitored using the plurality of cameras 12. The data analysis module 58 measures traffic volume in certain embodiments by processing data from various sources (i.e., cameras 12) to accurately measure the volume of traffic passing though different points in the traffic network. Moreover, by analyzing the timestamps associated with images of particular vehicles at different points in the traffic network, the data analysis module 58 may calculate the time taken by the vehicles to travel from point A to point B, for example, which may provide insights for route optimization in the event of a future lane closure or detour. In fact, in certain embodiments where a sufficient number of appropriately located cameras 12 are provided, the system 40 can detect and report on lane usage patterns, preferred routes, average travel times and responses to traffic signals and/or incidents.

As should be apparent from the foregoing, the data analysis module 58 is the source of a wide variety of real-time notifications, recommendations, reports and even direct commands for controlling existing traffic management infrastructure 51 (FIG. 3) such as streetlights. The notifications may be customized based on the severity of the condition giving rise to the notification, the location of the condition and/or the nature of the anomaly. Along with the notifications, the data analysis module 58 may provide real-time recommendations for potential corrective actions to mitigate the traffic condition (e.g., lane closures, recommended alternative routes, street closures, etc.). In this manner, the system 40 permits rapid responses to traffic conditions which may improve public safety and enhance the efficient use of traffic infrastructure.

Referring now to FIG. 4, a method of collecting, analyzing and using traffic information is depicted. The method 70 begins at step 72 where the cameras 12 capture images of license plates and convert the images to license plate characters as described above. The cameras 12 include other information with each license plate image, including the camera ID and/or location, vehicle type and a timestamp. At step 74, the license plate characters and the other data are transmitted over the network 16 to the central server 42. The license plate characters may be automatically transmitted substantially simultaneously with its capture by the camera 12, or it may be temporarily stored by the camera 12 until it is accessed by the central server 42. The access by the central server 42 may be periodic on a fixed schedule or based upon an anticipated volume of license plate data captured by the camera 12 given the knowledge of the central server 42 of historic traffic conditions associated with the camera 12. At step 76 the data collection module 50 extracts the license plate characters, timestamps, vehicle type and camera IDs from the images. At step 78 the data collection module 50 packages the extracted data (i.e., the license plate characters, the timestamps, the vehicle type and the camera IDs) into license plate files. The license plate files are provided to the data anonymization module 52, which anonymizes the data in the license plate files as indicated by step 80 and described above. The anonymized license plate data is received by the data storage module 54 and stored in the central database 56 at step 82.

At step 84, the license plate file data is analyzed by the data analysis module 58 to identify traffic trends, calculate travel times of individual vehicles, predict traffic flows and volumes, provide real-time traffic information and generate alerts or notifications of traffic anomalies and/or control traffic management infrastructure 51 depending upon the application. As part of the data analysis, the license plate file data may be provided to machine learning algorithms as training data as depicted in step 86. The outputs of the machine learning algorithms may be used by the data analysis module 58 in the analysis of the license plate file data as described herein. The data analysis module 58 may also receive external data from the one or more external data sources 62 which is used in the analysis of the license plate file data as indicated by step 88.

At step 90, the data analysis module 58 provide the output of these analyses (i.e., real-time information, forecasts, reports, etc.) to the user interface 60 and/or the user interface 46, the API 48 and/or the public user interface 49 via the network 44. In this manner, the data analysis module 58 may, among other things, permit traffic managers to swiftly respond to anomalies in traffic volume or patterns. As described above, the output of the analyses may be routed to the user interface 46 in the form of alerts (step 92) to provide information about potential accidents and/or to recommended routes for emergency responses based on traffic conditions and historical data. The outputs of the data analysis module 58 may also be directly integrated with various traffic management infrastructure 51 to provide real-time commands (step 94) for adjustments to, for example, traffic signals.

Any directional references used with respect to any of the figures, such as right or left, up or down, or top or bottom, are intended for convenience of description, and do not limit the present disclosure or any of its components to any particular positional or spatial orientation. Additionally, any reference to rotation in a clockwise direction or a counterclockwise direction is simply illustrative. Any such rotation may be implemented in the reverse direction as that described herein.

Although the foregoing text sets forth a detailed description of embodiments of the disclosure, it should be understood that the legal scope of the invention is defined by the words of the claims set forth at the end of this patent and equivalents. The detailed description is to be construed as exemplary only and does not describe every possible embodiment. Numerous alternative embodiments may be implemented, using either current technology or technology developed after the filing date of this patent, which would still fall within the scope of the claims.

The following additional considerations apply to the foregoing description. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different hardware module at a different instance of time.

Modules may provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at various times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single device or geographic location (e.g., within a home environment, an office environment, or a server farm). In other example embodiments, the one or more processors or processor-implemented modules may be distributed across a number of devices or geographic locations.

In addition, the aspects and functionalities described herein may operate over distributed systems (e.g., cloud-based computing systems and/or network-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Unless specifically stated otherwise, use herein of words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Additionally, some embodiments may be described using the expression "communicatively coupled," which may mean (a) integrated into a single housing, (b) coupled using wires, or (c) coupled wirelessly (i.e., passing data/commands back and forth wirelessly) in various embodiments.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

One of ordinary skill in the art will realize that the embodiments provided can be implemented in hardware, software, firmware, and/or a combination thereof. For example, the controllers disclosed herein may form a portion of a processing subsystem including one or more computing devices having memory, processing, and communication hardware. The controllers may be a single device or a distributed device, and the functions of the controllers may be performed by hardware and/or as computer instructions on a non-transient computer readable storage medium. For example, the computer instructions or programming code in the controller may be implemented in any viable programming language such as C, C++, C#, python, JAVA or any other viable high-level programming language, or a combination of a high-level programming language and a lower level programming language.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

It should be understood that the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

I claim:

1. A method of controlling traffic management infrastructure, comprising:

capturing images of vehicle license plates using a plurality of cameras;

converting the images to license plate data including license plate characters;

transmitting the license plate data via a first network to a central server having a data collection module, a data anonymization module, a data storage module and a data analysis module;

extracting, by the data collection module, the license plate characters from the license plate data;

packaging, by the data collection module, the license plate characters in license plate files;

anonymizing, by the anonymization module, the license plate files;

storing, by the data storage module, the anonymized license plate files;

analyzing, by the data analysis module, the anonymized license plate file to identify a traffic condition; and outputting, by the data analysis module, at least one command to at least one component of traffic management infrastructure, thereby causing the component to adjust an aspect of traffic management based upon the identified traffic condition.

2. The method of claim 1, wherein the plurality of cameras are motion-sensitive, high-speed traffic cameras.

3. The method of claim 1, wherein transmitting the images via the network to the central server occurs in near real-time with the capturing step.

4. The method of claim 1, wherein extracting includes extracting, by the data collection module, timestamp data, vehicle type and camera ID data from the license plate data.

5. The method of claim 4, wherein packaging includes packaging, by the data collection module, the timestamp data, the vehicle type and the camera ID data into the license plate files.

6. The method of claim 1, wherein anonymizing includes transforming, by the anonymization module, characters in the extracted license plate characters into a format which prevents recreation of the extracted license plate characters.

7. The method of claim 1, wherein storing includes indexing, by the data storage module, data in the anonymized license plate files based upon parameters including time, location or camera ID.

8. The method of claim 1, wherein analyzing the anonymized license plate file includes providing the anonymized license plate file to at least one machine learning model and identifying, based upon an output of the at least one machine learning model, the traffic condition.

9. The method of claim 1, wherein analyzing the anonymized license plate file includes receiving, from at least one external data source, external data representing at least one of a current weather condition, a public transportation schedule or special even information.

10. The method of claim 1, further comprising outputting by the data analysis module, a notification regarding the traffic condition to a user interface via a second network.

11. The method of claim 1, wherein the traffic condition includes a traffic volume, a traffic pattern, or a traffic anomaly.

12. The method of claim 1, wherein the component of the traffic management infrastructure is a traffic signal and the aspect adjusted is a timing of operation of the traffic signal.

13. A traffic analysis system, comprising:

a plurality of cameras, each camera of the plurality of cameras being configured to capture images of license plates on vehicles passing the camera and convert the images into license plate data including license plate characters;

a central server coupled to the plurality of cameras via a first network, the central server including a data collection module, a data anonymization module, a data storage module and a data analysis module; and a traffic management component coupled to the central server via a second network;

wherein the data collection module is configured to receive the license plate data from the plurality of cameras and package the license plate characters in license plate files;

wherein the anonymization module is configured to anonymize the license plate files; and wherein the data analysis module is configured to analyze the anonymized license plate file to identify a traffic condition and output at least one command to the traffic management component, thereby causing the component to adjust an aspect of traffic management based upon the identified traffic condition.

14. The system of claim 13, wherein the data collection module is coupled to the plurality of cameras via the first network to receive the images in near real-time.

15. The system of claim 13, wherein the data collection module is further configured to extract timestamp data, vehicle type data and camera ID data from the images.

16. The system of claim 13, wherein the anonymization module is configured to transform characters in the extracted license plate characters into a format which prevents recreation of the extracted license plate characters.

17. The system of claim 13, wherein the central server further includes at least one machine learning model configured to receive the anonymized license plate files and provide an output the data analysis module uses to identify the traffic condition.

18. The system of claim 13, wherein the data analysis module is further configured to receive, from at least one external data source, external data representing at least one of a current weather condition, a public transportation schedule or special even information.

19. The system of claim 13, wherein the traffic management component is a traffic signal and the aspect adjusted is a timing of operation of the traffic signal.

20. A method for analyzing traffic, comprising:

capturing images of vehicle license plates using a plurality of cameras and converting the images into license plate data including license plate characters;

transmitting the license plate data via a first network to a central server having a data collection module, a data anonymization module, a data storage module and a data analysis module;

extracting, by the data collection module, the license plate characters from the license plate data;

packaging, by the data collection module, the license plate characters in license plate files;

anonymizing, by the anonymization module, the license plate files;

storing, by the data storage module, the anonymized license plate files;

analyzing, by the data analysis module, the anonymized license plate file to identify a traffic condition; and outputting, by the data analysis module, a notification regarding the traffic condition to at least one user interface.

* * * * *